(12) United States Patent
Anayas

(10) Patent No.: US 6,722,241 B1
(45) Date of Patent: Apr. 20, 2004

(54) COMBINATION CUTTING BOARD AND SLICING BRACE

(76) Inventor: Gil Anayas, 51 Plumas Cir., Novato, CA (US) 94947

( * ) Notice: Subject to any disclaimer, the term of this patent is extended or adjusted under 35 U.S.C. 154(b) by 72 days.

(21) Appl. No.: 10/156,044

(22) Filed: May 28, 2002

(51) Int. Cl.$^7$ .................................................. B26D 4/50
(52) U.S. Cl. ................................................ 83/459; 83/449
(58) Field of Search ........................... 83/459, 762, 437, 83/454, 464, 761, 763, 449, 468, 522, 455, 937, 167, 468.1–468.6, 452, 453; 269/87.2, 236, 238, 295, 294, 292, 291, 290

(56) References Cited

U.S. PATENT DOCUMENTS

| | | | | |
|---|---|---|---|---|
| 1,405,720 A | * | 2/1922 | Scott ............................ | 83/762 |
| 1,580,376 A | * | 4/1926 | Jarosz ......................... | 83/174.1 |
| 1,753,371 A | * | 4/1930 | Georgopoulos ............. | 83/466.1 |
| 2,172,538 A | * | 9/1939 | Katzinger .................... | 83/762 |
| 2,611,406 A | * | 9/1952 | Preble, Jr . ................... | 83/717 |
| 3,850,422 A | * | 11/1974 | Kwas ........................... | 269/196 |
| 3,967,519 A | * | 7/1976 | Esterly ......................... | 83/455 |
| 3,971,273 A | * | 7/1976 | Peter et al. ................... | 83/42 |
| 4,051,758 A | * | 10/1977 | Livick ......................... | 83/437.2 |
| 4,057,239 A | * | 11/1977 | Hopf et al. .................. | 269/170 |
| 4,085,642 A | * | 4/1978 | Birmingham ................ | 83/764 |
| 4,249,445 A | * | 2/1981 | Browning .................... | 83/762 |
| 4,448,406 A | * | 5/1984 | Hallberg et al. ............ | 269/224 |
| 4,747,331 A | * | 5/1988 | Policella ...................... | 83/762 |
| 5,348,276 A | * | 9/1994 | Blacker ........................ | 269/88 |
| 5,383,384 A | * | 1/1995 | Dennis ......................... | 83/762 |
| 5,611,266 A | * | 3/1997 | Kensrue ....................... | 99/537 |
| 5,673,608 A | * | 10/1997 | DeMars ....................... | 99/329 R |
| 2002/0151266 A1 | * | 10/2002 | Kidushim et al. .......... | 452/135 |

* cited by examiner

Primary Examiner—Allan N. Shoap
Assistant Examiner—Ghassem Alie

(57) ABSTRACT

The combination cutting board and slicing brace is a device designed to satisfy two needs that coexist in the food preparation process. One of these needs is a device designed to safely hold food product while it is being sliced. The other of these needs is a surface for additional types of cutting such as chopping or dicing. The present invention consists of a unique structure that does not exist in the prior art and addresses the structural and utilitarian deficiencies of these earlier designs. None of the designs in the prior art provide this unique combination of uses. The structure of the present invention also incorporates a uniquely designed sliding arm that can be incorporated within said cutting surface while controlling the bracing device, thus producing a streamlined homogenous unit that can be stored and cleaned easily.

9 Claims, 3 Drawing Sheets

COMBINATION CUTTING BOARD AND SLICING BRACE

BACKGROUND OF THE INVENTION

1. Field of the Invention

The present invention relates to a cutting board designed to facilitate slicing by providing a safe and efficient bracing mechanism for bread and other food product while incorporating a cutting surface for other common food preparation tasks.

2. Description of the Prior Art

The use of sharp cutting instruments to slice food product has proven to be a hazardous task that has led to many unfortunate injuries, ranging from cuts to the loss of fingers. Generally, these injuries occur because the victims were using their free hand to support the food product, placing that hand in a dangerous position. The solution to this problem is to provide a means for supporting food that will allow the user to keep his hands out of harms way. The device should provide a bracing mechanism that can allow easy control of the force applied in bracing. Bread is a food item that is commonly sliced and the force must be moderated so as to prevent smashing. Many of the devices in the prior art do not provide the capability to make a subtle variation in the bracing force and are restrictive in their use because of their design. The bracing mechanism provided in the present invention can be varied for use with food items of almost any size and delicacy.

While there are numerous devices that exist in the prior art that provide some form of support for slicing food, they ignore the fact that slicing is only one of many food preparation tasks that are required. A cutting surface is required for other jobs such as dicing and chopping. With all of the inventions in the prior art it is necessary to store, find and clean separate units. The present invention combines a bracing mechanism with a cutting surface for other food preparation needs. Unlike previous inventions, this is accomplished with a minimum number of parts so as to make cleaning and maintenance simple. A cook can alternate easily between slicing and dicing, for example, without the need to switch back and forth between tools. Anyone who has performed the task of preparing large amounts of food can understand the importance of this kind of efficiency.

U.S. Pat. No. 5,577,430 to Glen K. Gunderson discloses a device that is designed to assist in the slicing of bread. The design incorporates a slot that guides the pathway of a knife in a vertical path. In addition it provides a surface against which the bread can be placed so as to keep it in one place during the cutting. The position of this surface is variable according to the thickness desired by the user. The device does not provide a means of support on the other side of the bread thus requiring the user to hold that end with his hand. This increases the risk of injury for the user particularly for narrow breads such as bagels. While this design provides a means for adjusting the thickness of a particular slice, it does not enable the user to fully support the food product while keeping their hands out of harms way. The Gunderson '430 Patent also does not provide an incorporated flat cutting surface that can be used for additional food preparation tasks.

U.S. Pat. Nos. 5,611,266 and 5,724,877 to Milo M. Kensrue discloses a device for holding food product while the user slices it. This invention incorporates a flat stationary surface that contacts one side of the food product while the opposite side is supported by a brace that is held against said opposite side by one of two mechanisms. One mechanism uses a spring to provide the support for said brace, while the other uses a variable screw clamp. Neither of these mechanisms allow for the ease and sensitive control that is provided by the combination cutting board and slicing brace. The present invention incorporates a sliding base for the brace support, which allows the user to directly apply the appropriate force. The Kensrue '877 patent also provides no cutting surface for other food preparation.

U.S. Pat. No. 4,125,046 to Norma J. Kroh and George Spector provides aspects that are similar to the present invention for bracing food product during the slicing process. However, the overall design is awkward because it requires separate pieces to store and clean and it incorporates an enclosed frame that would limit the size of food product sliced. The Kroh '046 patent also fails to disclose a cutting surface for additional tasks.

U.S. Pat. No. 4,085,642 to Thomas F. Buckingham provides a sliding support for its bracing mechanism as does the present invention, but the design of this sliding mechanism is distinctly different. The sliding support in the present invention is designed so that it can be incorporated into a cutting surface. The result is an efficient design that combines both a cutting board and a bracing device for slicing. The Buckingham '642 patent employs a rail mechanism that could not be incorporated into a flat cutting surface.

U.S. Pat. No. 389,380 to Simon Yin-Chung Liu, Cheng Yue-Chun, and Kwai Chung is a design patent that discloses a wrack for slicing. While this device is designed for assistance in the slicing of food product, its sole purpose is to provide a means for guiding the cutting instrument during the slicing process. It provides support on only one side and therefore would require the user to use her hand to support the other side. It also does not provide for a means for incorporating a cutting surface such as the cutting board in the present invention.

Therefore a need exists for a novel and enhanced tool for bracing food product during the slicing process while providing a cutting surface for other food preparation procedures. Combining these tasks in a single unit would increase efficiency and minimize the use of storage space. In addition, the design should maximize the safety of the user. In this respect, the combination cutting board and slicing brace according to the present invention substantially departs from the conventional concepts and designs of the prior art, and in doing so provides an apparatus primarily developed for the purpose of slicing food safely and providing a cutting surface.

SUMMARY OF THE INVENTION

In view of the foregoing disadvantages inherent in the known types of devices for assisting in the slicing process now present in the prior art, the present invention provides an improved combination of security and utility, and overcomes the abovementioned disadvantages and drawbacks of the prior art. As such, the general purpose of the present invention, which will be described subsequently in greater detail, is to provide a new and improved combination cutting board and slicing brace which has all of the advantages of the prior art mentioned heretofore and many novel features that result in a combination cutting board and slicing brace which is not anticipated, rendered obvious, suggested, or even implied by the prior art, either alone or in combination thereof.

In furtherance of this objective, the combination cutting board and slicing brace comprises a cutting board that has a groove in its upper surface. Sliding within said groove is an arm that is shaped so as to create a flat upper surface that combines with the upper surface of said cutting board to create a solid cutting surface. Said arm is also configured to enable the user to grasp the arm for sliding to a desired location. Connected to one end of said arm is a first jaw for clamping food products. Connected to the upper surface of said cutting board is a second jaw positioned opposite of said first jaw so as to clamp the opposite side of food product clamped by said first jaw.

There has been outlined, rather broadly, the more important features of the invention in order that the detailed description thereof that follows may be better understood and in order that the present contribution to the art may be better appreciated.

The arm in said present invention may in addition comprise a cavity that opens on the surface of the end attached to said first jaw and extends to a inner wall inside of said arm. One end of a coil spring is attached to this inner wall. The other end of the coil spring is attached to a beam shaped to slide within said cavity. The beam will be sufficiently long so as to extend out of said cavity when the coil spring is fully extended and provide an upper surface for which to rest food product that is level with the lower edge of the surface of said first jaw.

An additional aspect of the combination cutting board and slicing brace is that the above-described jaws will comprise a shape wherein the top surface is angled upward from the upper edge contiguous with the surface contacting the food product so as to guide the blade of a knife towards the upper surface of the food product. Another feature of the jaws will be pyramidal shaped spikes that are connected to the clamping surface so as to secure the food product being sliced.

Numerous objects, features and advantages of the present invention will be readily apparent to those of ordinary skill in the art upon a reading of the following detailed description of presently preferred, but nonetheless illustrative, embodiments of the present invention when taken in conjunction with the accompanying drawings. In this respect, before explaining the current embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved combination cutting board and slicing brace that has all of the advantages of the prior art and none of the disadvantages.

It is another object of the present invention to provide a new and improved combination cutting board and slicing brace that may be easily and efficiently manufactured and marketed.

An even further object of the present invention is to provide a new and improved combination cutting board and slicing brace that has a low cost of manufacture with regard to both materials and labor, and which accordingly is then susceptible of low prices of sale to the consuming public, thereby making such combination cutting board and slicing braces economically available to the buying public.

Still another object of the present invention is to provide a new combination cutting board and slicing brace that provides in the apparatuses and methods of the prior art some of the advantages thereof, while simultaneously overcoming some of the disadvantages normally associated therewith.

These together with other objects of the invention, along with the various features of novelty that characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts throughout the various figures.

DESCRIPTION OF THE PREFERRED EMBODIMENT

Figure 1:
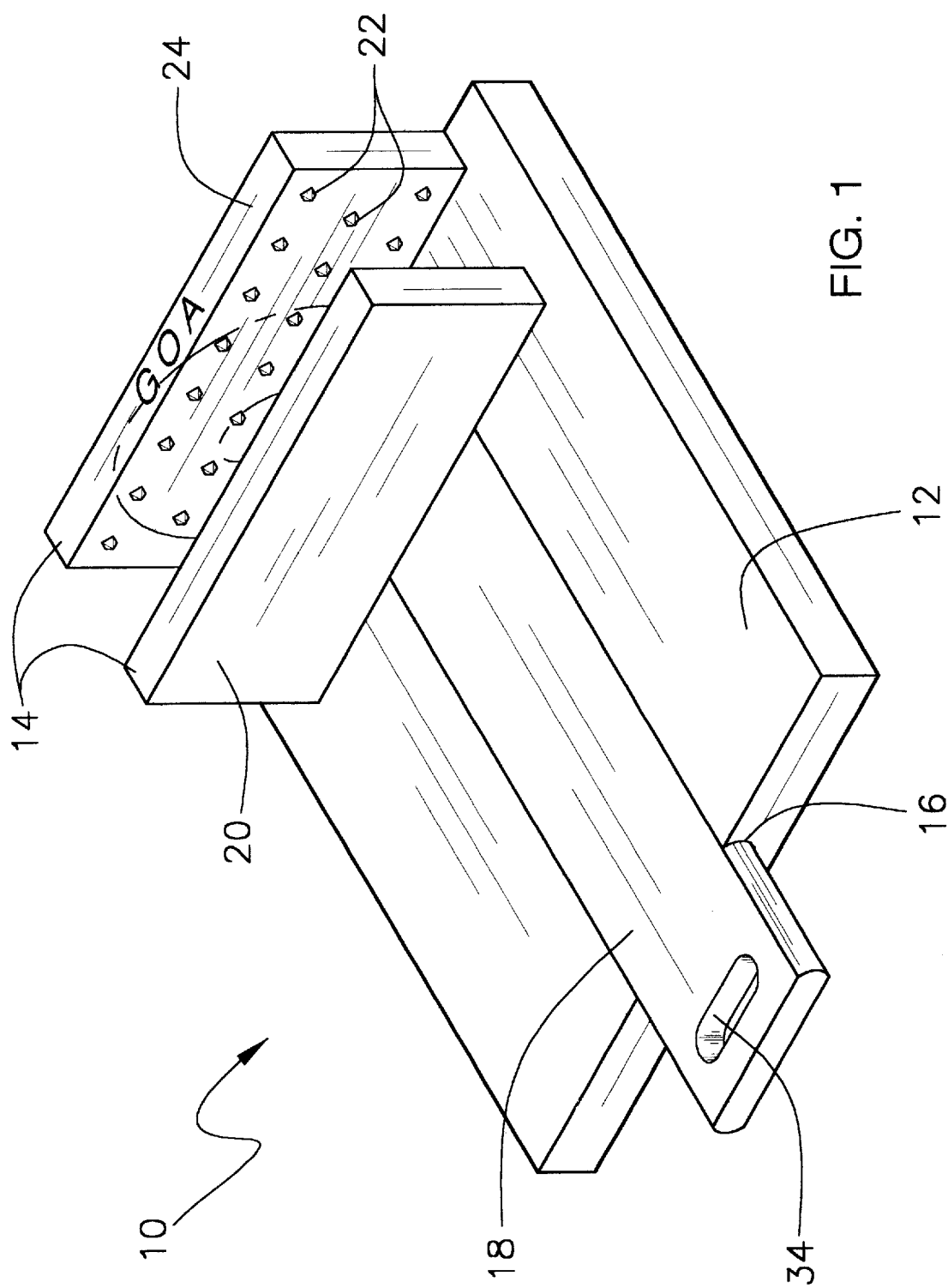
FIG. 1 is a top perspective view of the preferred embodiment of the combination cutting board and slicing brace of the present invention.

Referring now to the drawings, and particularly to FIGS. 1–5, a preferred embodiment of the combination cutting board and slicing brace of the present invention is shown and generally designated by the reference numeral 10.

In FIG. 1 is a cutting board 12 comprising a rectangular shape, a front surface and a rear surface. Said cutting board 12 further comprises an upper surface shaped to form a groove 16 extending from said front surface to a point near said rear surface. Attached to the cutting board is a brace 14. A stationary rectangular jaw 24 is shown connected to the upper surface of said cutting board 12 at a point adjacent to said rear surface. Said stationary jaw 24 comprises a clamping surface orthogonal to the axis of said groove 16 and facing said front surface of said cutting board 12. Attached to said clamping surface is multiple spikes 22 comprising a pyramidal shape. In addition FIG. 1 displays a rectangular shaped sliding arm 18 that fits snuggly within said groove 16 and wherein said arm 18 comprises an upper surface that forms a solid plane in connection with said upper surface of said cutting board 12. Said arm 18 comprises a front end and a rear end. Said arm 18 also comprises a hole 34 near said front end wherein said hole 34 is shaped to enable the user to grasp said arm 18 by passing their fingers through said hole 34. This will allow the user to apply force in order to slide said arm 18 to the desired position. Connected to said upper surface of said arm 18 is a sliding rectangular jaw 20 adjacent to said rear end of said arm 18. Said sliding rectangular jaw 20 comprises a clamping surface orthogonal to the axis of said groove 16 and facing said rear surface of said cutting board 12.

The materials that can be used for the abovementioned parts are numerous and should not be narrowed by the following suggestions. Said cutting board 12 could be easily and cheaply made using wood or a hard plastic. These materials suit the needs of being easily shaped into the desired form while having a surface hard enough to withstand constant impact from the blade of sharp instruments. Materials should not be chosen that would be so hard that they would rapidly dull said instruments. For decorative or storage reasons, said cutting board 12 may comprise shapes other then rectangular.

Said stationary 24 and sliding jaws 20 can consist of the same material used for the cutting board 12 or an alternate material. Again wood and hard plastic would be inexpensive material that could be easily shaped to the desired form. Metal also might be suited for this purpose. In addition, composites of these materials would be appropriate. The shape could be easily adjusted for decorative reasons or to add additional features such as a whet stone for sharpening. The upper surface can be used for decorative patterns or for personalization by inscribing the users initials. The spikes attached to said jaws can de made of materials such as metal, wood, and plastic. They could also have shapes other then pyramidal such as conical. An embodiment can be envisioned comprising detachable clamping surfaces that would comprise different spikes or a flat surface depending on the food product being sliced.

Said arm 18 can be made of the same material chosen to create the aforementioned cutting board 12 if a homogenous surface is desired. Alternate materials can also be used to provide variety in cutting surfaces if necessary. The hole 34 for grasping could be easily replaced by a knob or an external handle that could be made from wood, metal, or plastic. The design could be altered so that the upper surface could offer other uses such as a sharpening tool or a grater.

Figure 2:
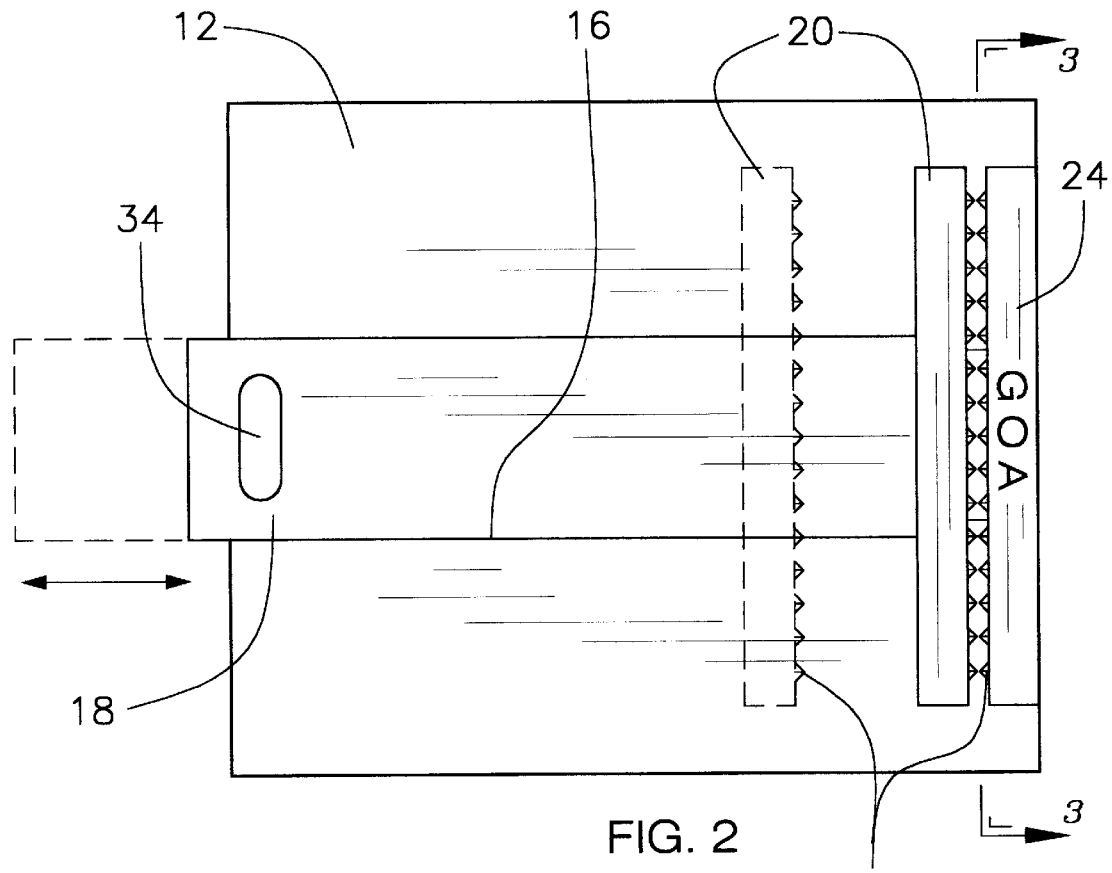
FIG. 2 is a top side view of the combination cutting board and slicing brace of the present invention illustrating the sliding motion of a clamping jaw.

In FIG. 2 a top side view of said combination cutting board and slicing brace 10 is shown that demonstrates the sliding motion of said arm 18. In the figure, said arm is rectangular and comprises a front end and a rear end. Said arm further comprises a hole 34 located near the front end shaped to allow the passing through of the user's fingers for grasping. The top surface of said sliding jaw 20 is shown in two positions. The first position depicted is of the sliding jaw 20 slid to a fully closed position. The second position depicted is of the sliding jaw 20 after it has been retracted. The outlined image depicted on the left demonstrates the position of the front end of said arm 18 when said sliding jaw 20 is retracted. Also depicted is the top surface of said stationary jaw 24 with a demonstration of the kind of decorative additions that could be made. Attached to the clamping surface of both jaws are multiple pyramidal spikes 22. All of the variations suggested above would apply here as well, as would the possible materials.

Figure 3:
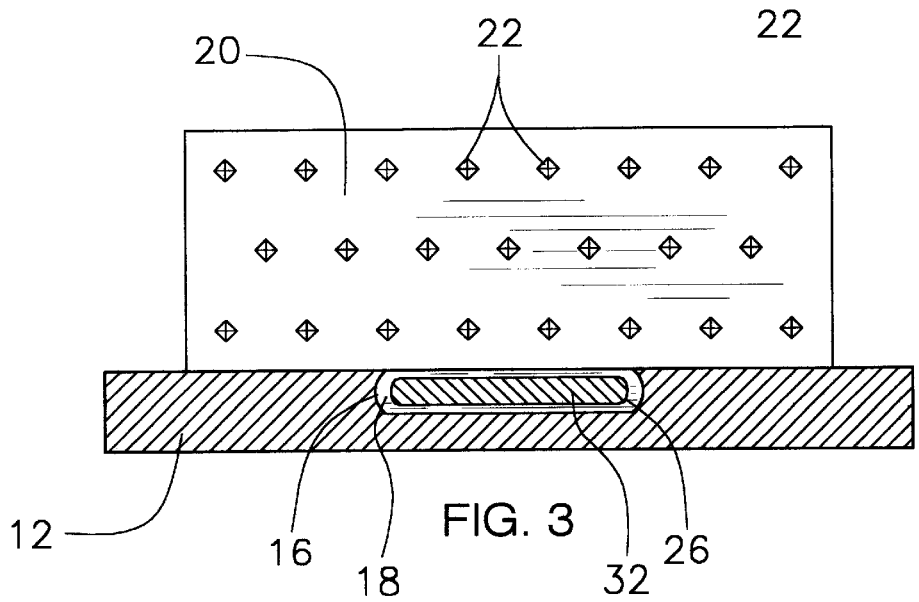
FIG. 3 is a sectional view of the combination cutting board and slicing brace of the present invention.

In FIG. 3 a sectional view of said combination cutting board and slicing brace 10 is shown. This view faces towards the front of said cutting board 12. Said clamping surface of said sliding jaw 20 is shown with a rectangular shape and attached to the surface is multiple pyramidal spikes 22. Said spikes 22 are depicted in three rows, equally spaced, and with said spikes on the inner row positioned at the mid-point of the spikes of the first and second rows. This juxtaposition increases the gripping capability of said jaws, 20 and 24. As suggested earlier, the shape of said spikes 22 can be varied according to purpose. It should also be noted that the pattern of said spikes 22 could also be rearranged according to the particular food product being sliced. The combination cutting board and slicing brace can also have an alternate design whereby the surface of said jaws, 20 and 24, can be slidably removed to allow for cleaning and variation in surfaces.

Also shown in FIG. 3 is a sectional view of said cutting board 12 facing towards said front surface and illustrates in the outer hashed area a long rectangular shape formed between the upper and lower surface of said cutting board. A view of the aforementioned groove 16 is depicted at the top center of said cutting board 10 by an outlined area. The outer edge is shown having a rectangular shape with rounded sides. The top of this rectangular shape is shown to connect with the upper surface of said cutting board 12. It should be noted that this is only one suggestion for the shape of said groove 16. An oval could be used as well or the sides could be flat if deemed appropriate. The white area within the outlined groove 16 depicts a sectional view of said arm 18 and comprises a shape that mirrors the rounded rectangular shape of said outline so as to allow said arm 18 to slide within said groove 16. Said arm 18 further comprises a cavity 26, the outline of which is shown within said white area. Depicted within said outline of said cavity 26 is a hatched sectional view of a beam 32. Said beam 32 has a rectangular shape with curved ends and slides within said cavity 26. Said beam 32 could be made of several materials such as wood, plastic or metal.

Figure 4:
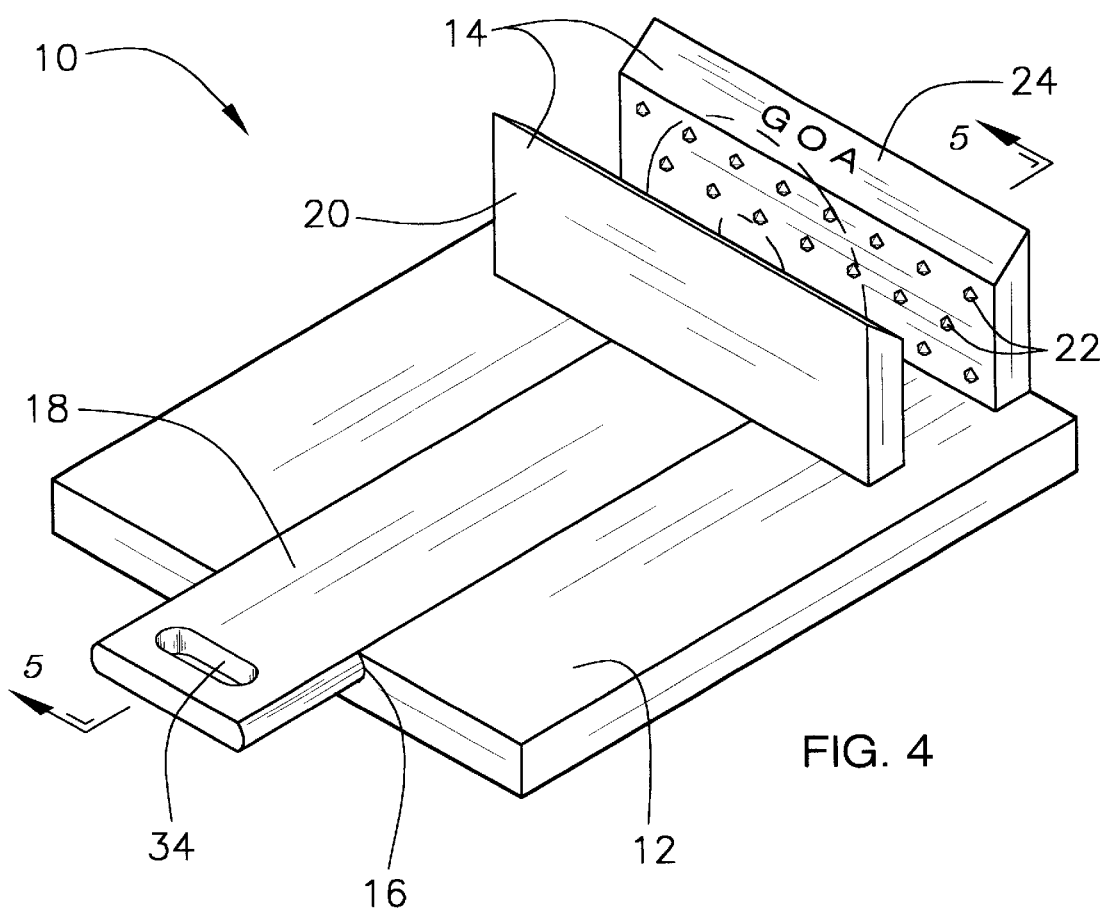
FIG. 4 is an alternate top perspective view of the combination cutting board and slicing brace of the present invention comprising a protective slicing guide.

FIG. 4 is an alternate design of the combination cutting board and slicing brace 10 that includes a safety feature not depicted in FIG. 1. In this figure the top edges of said jaws, 20 and 24, are slanted towards said clamping surfaces. This slant will act to guide the blade of a cutting instrument towards the area between said jaws so that it cannot slip outwards and injure the user. The slant could be substituted with a curved surface and can be covered with many alternate materials such as plastic and metal. The surface can be marked for decorative purposes as demonstrated by the initials "GOA" depicted in FIG. 5.

Figure 5:
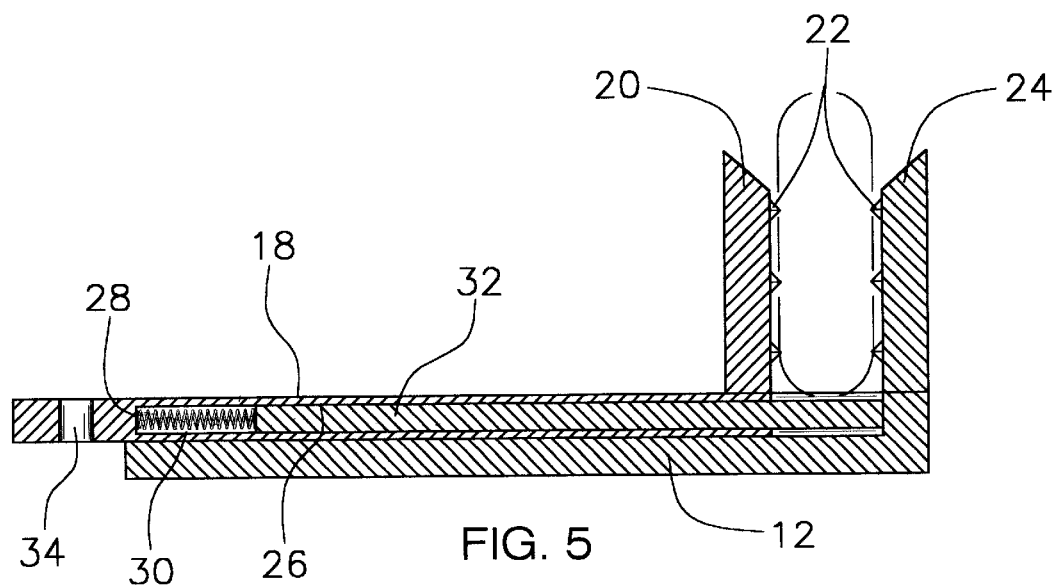
FIG. 5 is a right side sectional view of the combination cutting board and slicing brace comprising a protective slicing guide.

In FIG. 5 a sectional view of the combination cutting board and slicing brace 10 is shown facing towards the left side. This view is shown at the mid point of the cutting board 12 so that it passes down the center axis of said groove. At the left is depicted said front end of said arm 18, which extends beyond said front surface of said cutting board 12. The outer edge of said arm 18 is shown comprising a rectangular shape. Also depicted by a white rectangle is a hole 34 located near said front end. Said hole 34 is shaped to allow the passing of fingers for grasping and opens to the upper and lower surfaces of said arm 18.

The rear end of said arm 18 is shown comprising an opening that leads to a cavity 26 that extends within the majority of said beams length and terminates at an inner wall 28. Attached to said inner wall is a coil spring 30. Said spring 30 could be made of metal or plastic and could be replaced by other retracting mechanisms such as helical or air springs. Said spring 30 comprises a front end and a rear end wherein said front end is connected to said inner wall 28 and said rear end is attached to said front end of said beam 32. Said beam 32 is depicted by a rectangular shape that is connected to said coil spring 30 at said front end of said beam 32 and extends to contact the lower portion of said clamping surface of said stationary jaw 24. The position of said sliding arm 18 is shown when said coil spring 30 is fully extended. The User can grasp said arm 18 using said hole 34 and push said arm 18 towards said rear surface of said cutting board 10. Due to this force said coil spring 30 will compress and said front end of said beam 32 will move closer to said inner wall 28. Concurrently said clamping surface of said sliding jaw 20 will move closer to said clamping surface of said stationary jaw 24 so as to grasp food product such as the bagel shown in FIG. 5. Due to the expanding force of said coil spring 30, said rear end of said beam 32 will remain in contact with the lower portion of said clamping surface of said stationary jaw 24 and provide a platform upon which the food will rest. This design is an added feature that will position the food product on a plane level with the top surface of said cutting board 12. However the design could be modified to allow said beam 32 to be removed if this would not be desirable. The surface of said beam 32 could be modified to contain depressions that would receive various shapes of food. Said beam 32 could be made of materials such as wood or plastic that could match the materials used for the cutting board 12. Such materials should be easily shaped so as to form the desired sliding shape.

FIG. 5 also depicts a sectional view of said sliding jaw 20 comprising a rectangular surface that further comprises said alternate safety feature. Said feature comprises a slanting upper surface that angles downward toward said clamping surface of said sliding jaw 20 and acts as a guide for cutting instruments towards the food and away from the user. Attached to said clamping surface of said sliding jaw 20 is said spikes 22 for gripping food. Said sliding jaw 20 comprises a lower surface that is connected to the upper surface of said cutting board 12.

FIG. 5 further depicts a stationary jaw 24 comprising a rectangular shape and also comprising said alternate safety feature. In this embodiment, said safety feature comprises a slant in the upper surface of said jaw 24 that angles downward toward said clamping surface of said stationary jaw 24. Said slant acts to guide a cutting instrument away from the user. Attached to said clamping surface of said stationary jaw 24 is said spikes 22 for gripping food. Said clamping surface of said stationary jaw 24 is shown as flat. This shape could be varied to conform to particular food items if that would enhance the gripping quality of the brace portion of the present invention. Said stationary jaw 24 comprises a lower surface that is connected to the upper surface of said cutting board and is adjacent to said rear end of said cutting board.

While a preferred embodiment of the combination cutting board and slicing brace 10 has been described in detail, it should be apparent that modifications and variations thereto are possible, all of which fall within the true spirit and scope of the invention. With respect to the above description then, it is to be realized that the optimum dimensional relationships for the parts of the invention, to include variations in size, materials, shape, form, function, and manner of operation, assembly and use, are deemed readily apparent and obvious to one skilled in the art, and all equivalent relationships to those illustrated in the drawings and described in the specification are intended to be encompassed by the present invention. For example, any suitable flexible material may be used instead of the fabrics that have been described. And although the slicing of food product has been described, there are slight variations, such as shape and size that would make the invention appropriate for other items.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A combination cutting board and slicing brace comprising:

a platform comprising an upper surface for food preparation, wherein said upper surface of said platform comprises a groove;

a sliding arm having an inner wall that slides within said groove; and a clamp attached to said platform and attached to said sliding arm, wherein said clamp comprises a sliding jaw that is connected to said sliding arm and has an upper surface and a stationary jaw that is connected to said upper surface of said platform and has an upper surface, wherein said upper surface of said sliding jaw and said upper surface of said stationary jaw are angled downwards and inwards towards an item clamped between said sliding jaw and said stationary jaw;

a coil spring comprising a front and a rear end wherein said front end is attached to said inner wall; and a beam comprising a front end wherein said front end is attached to said rear end of coil spring and wherein the beam slides within a cavity, wherein said sliding arm defined said cavity therein.

2. The combination cutting board and slicing brace of claim 1 wherein said sliding jaw comprises a clamping surface and wherein said combination cutting board and slicing brace further comprises spikes attached to said clamping surface of said sliding jaw.

3. The combination cutting board and slicing brace of claim 1 wherein said stationary jaw comprises a clamping surface and wherein said combination cutting board and slicing brace further comprises spikes attached to said clamping surface of said stationary jaw.

4. A combination cutting board and slicing brace comprising:

a platform comprising an upper surface for food preparation, wherein said upper surface of said platform comprises a groove;

a sliding arm that slides within said groove, wherein said arm further comprises a cavity and an inner wall;

a coil spring comprising a front and a rear end wherein said front end is attached to said inner wall;

a clamp comprising a stationary jaw and a sliding jaw wherein said sliding jaw comprises a clamping surface and said stationary jaw comprises a clamping surface with a lower portion, wherein said stationary jaw is attached to said upper surface for food preparation and wherein said sliding jaw is attached to said sliding arm; and a beam comprising a front end and a rear end wherein said front end is attached to said rear end of said coil spring, wherein said beam slides within said cavity and said coil spring ensures that said rear end of said beam will remain in contact with the lower portion of said clamping surface of said stationary jaw to provide a platform upon which an item clamped by said clamp will rest.

5. The combination cutting board and slicing brace of claim 4 wherein said sliding jaw comprises an upper surface that connects to said clamping surface of said sliding jaw, wherein said upper surface of said sliding law is angled downwards and inwards towards an item clamped between said sliding jaw and said stationary jaw.

6. The combination cutting board and slicing brace of claim 4 wherein said stationary jaw comprises an upper surface that connects to said clamping surface of said stationary jaw, wherein said upper surface of said stationary jaw is angled downwards and inwards towards an item clamped between said sliding jaw and said stationary jaw.

7. The combination cutting board and slicing brace of claim 4 wherein said combination cutting board and slicing brace further comprises spikes attached to said clamping surface of said sliding jaw.

8. The combination cutting board and slicing brace of claim 4 wherein and wherein said combination cutting board and slicing brace further comprises spikes attached to said clamping surface of said stationary jaw.

9. A combination cutting board and slicing brace comprising:
  a platform comprising an upper surface for food preparation, wherein said upper surface of said platform comprises a groove;
  a sliding arm that slides within said groove, wherein said arm further comprises a cavity and an inner wall;
  a coil spring comprising a front and a rear end wherein said front end is attached to said inner wall;
  a clamp comprising a stationary jaw and a sliding jaw wherein said sliding jaw comprises an upper surface and a clamping surface and said stationary jaw comprises an upper surface and a clamping surface with a lower portion, wherein said stationary jaw is attached to said upper surface for food preparation, said sliding jaw is attached to said sliding arm, and said upper surface of said sliding jaw and said upper surface of said stationary jaw are angled downwards and inwards towards said clamping surface of said sliding jaw and said clamping surface of said stationary jaw; and
  a beam comprising a front end and a rear end wherein said front end is attached to said rear end of said coil spring, wherein said beam slides within said cavity and said coil spring ensures that said rear end of said beam will remain in contact with the lower portion of said clamping surface of said stationary jaw to provide a platform upon which an item clamped by said clamp will rest.

* * * * *